United States Patent
Wu et al.

(10) Patent No.: US 9,435,572 B2
(45) Date of Patent: Sep. 6, 2016

(54) BIDIRECTIONAL FILTER AND HEAT PUMP SYSTEM

(75) Inventors: Linping Wu, Zhejiang (CN); Feng Chen, Zhejiang (CN); Weiwei Jiang, Zhejiang (CN)

(73) Assignee: Zhejiang Sanhua Co., Ltd., Zhejiang (CN)

( * ) Notice: Subject to any disclaimer, the term of this patent is extended or adjusted under 35 U.S.C. 154(b) by 376 days.

(21) Appl. No.: 14/235,428

(22) PCT Filed: Dec. 16, 2011

(86) PCT No.: PCT/CN2011/084116
§ 371 (c)(1),
(2), (4) Date: Jan. 27, 2014

(87) PCT Pub. No.: WO2013/026244
PCT Pub. Date: Feb. 28, 2013

(65) Prior Publication Data
US 2014/0144174 A1    May 29, 2014

(30) Foreign Application Priority Data
Aug. 25, 2011 (CN) .......................... 2011 1 0246525

(51) Int. Cl.
*F25B 30/02* (2006.01)
*B01D 35/15* (2006.01)
*F25B 43/00* (2006.01)

(52) U.S. Cl.
CPC ............... *F25B 30/02* (2013.01); *B01D 35/15* (2013.01); *F25B 43/003* (2013.01)

(58) Field of Classification Search
CPC ....... B01D 35/15; F25B 43/003; F25B 30/02
See application file for complete search history.

(56) References Cited

U.S. PATENT DOCUMENTS

| | | | | |
|---|---|---|---|---|
| 4,125,469 A | * | 11/1978 | Henton | .................. B01D 35/15 210/136 |
| 4,318,809 A | | 3/1982 | Bethel | |
| 4,320,000 A | * | 3/1982 | Lange | ................... B01D 15/00 210/117 |

(Continued)

FOREIGN PATENT DOCUMENTS

| CN | 2526756 Y | 12/2002 |
|---|---|---|
| CN | 2802389 Y | 8/2006 |

(Continued)

OTHER PUBLICATIONS

Extended European Search Report dated Apr. 17, 2015 including the Supplementary European Search Report and European Search Opinion from corresponding European Application 11871227.
International Search Report dated May 31, 2012 from corresponding International Application No. PCT/CN2011/084116.

*Primary Examiner* — Robert Clemente
(74) *Attorney, Agent, or Firm* — Wolf, Greenfield & Sacks, P.C.

(57) ABSTRACT

A bidirectional filter and a heat pump system. The bidirectional filter comprises a housing and at least two control value components. The two control value components divide the inner chamber of the housing into a filter chamber and two transitional chambers. The control value component comprises a frame body fixed on an inner wall of the housing, and an outlet blocking piece fitting an outlet of the frame body. The outlet blocking piece is on an outer side of the frame body. The bidirectional filter further comprises a protective member located in the filter chamber and fixed relative to the housing. The protective member is provided with a protective surface opposite to an outer side surface of the outlet blocking piece. When the pressure of a refrigerant in the pipeline is too high, the protective surface of the protective member can limit movement of the outlet blocking piece.

13 Claims, 4 Drawing Sheets

(56) References Cited

U.S. PATENT DOCUMENTS 4,954,252 A * 9/1990 Griffin .................. B01D 35/15
137/512.4
6,235,192 B1 * 5/2001 Melfi ..................... B01D 35/15
137/856

FOREIGN PATENT DOCUMENTS

| CN | 201427001 Y | 3/2010 |
| JP | S5271767 A | 6/1977 |
| JP | 7004789 A | 1/1995 |

* cited by examiner

BIDIRECTIONAL FILTER AND HEAT PUMP SYSTEM

The present application is the national phase of International Application No. PCT/CN2011/084116, titled "BIDIRECTIONAL FILTER AND HEAT PUMP SYSTEM", filed On Dec. 16, 2011, which claims the benefit of priority to Chinese Patent Application No. 201110246525.X, titled "BIDIRECTIONAL FILTER AND HEAT PUMP SYSTEM", filed with the Chinese State Intellectual Property Office on Aug. 25, 2011, both of which applications are incorporated herein in their entireties by this reference.

TECHNICAL FIELD

The present application relates to the technology of filters, and particularly to a bidirectional filter, and further to a heat pump system including the bidirectional filter.

BACKGROUND

A heat pump system is a common adjusting system for an air conditioner presently, and generally includes an outdoor heat-exchanging system, a heat pump unit and an indoor air conditioner terminal system, three of which are connected via corresponding pipelines. The heat pump unit drives refrigerant to flow in the pipelines; in the outdoor heat-exchanging system, the refrigerant exchanges heat with exterior matters (such as water or air) to absorb heat from the exterior matters or discharge heat; and in the indoor air conditioner terminal system, the refrigerant exchanges heat with indoor air to discharge heat into the room or absorb heat from the indoor air, thereby adjusting an indoor temperature.

In order to ensure the performance of the refrigerant, a purifying device is generally arranged in the pipelines for absorbing and filtering moisture, residual acid or other impurities in the refrigerant, and retaining the impurities in the purifying device, thereby purifying the refrigerant. For adapting to the bidirectional flowing of the refrigerant in the heat pump system and meanwhile simplifying the structure of the purifying device, a bidirectional filter is generally provided in the purifying device for purifying the refrigerant.

Figure 1:
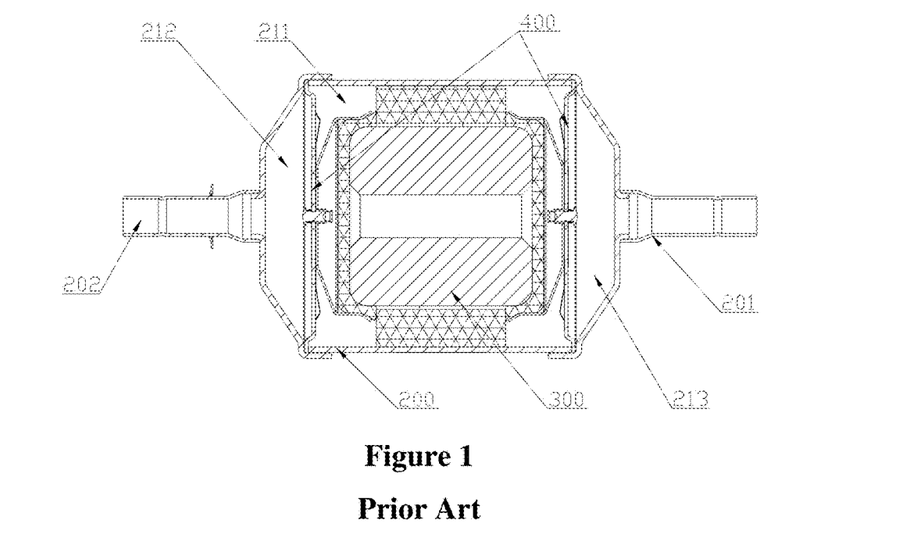
FIG. 1 is a schematic view showing the structure of a bidirectional filter in the prior art.
Figure 2:
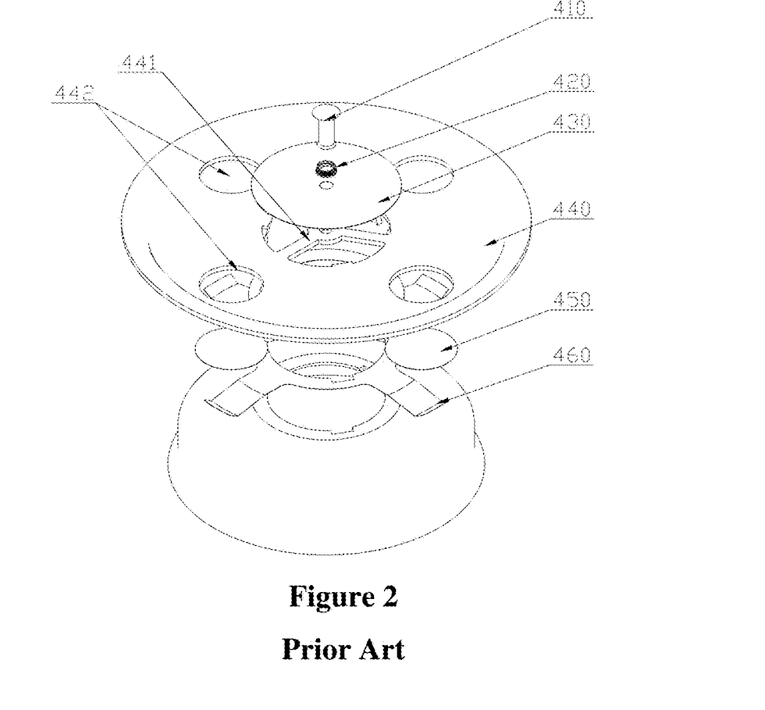
FIG. 2 is an exploded view of a control valve component in the bidirectional filter of FIG. 1.

Reference is made to FIGS. 1 and 2, wherein FIG. 1 is a schematic view showing the structure of a bidirectional filter in the prior art; FIG. 2 is an exploded view of a control valve component in the bidirectional filter of FIG. 1; and FIG. 2-1 and FIG. 2-2 are schematic views showing the operating principle of the control valve component in two states respectively, FIG. 2-1 is a schematic view showing the operating principle of the control valve component with an outlet being closed and an inlet being opened, and FIG. 2-2 is a schematic view showing the operating principle of the control valve component with the outlet being opened and the inlet being closed.

The bidirectional filter in the prior art includes a housing 200 of a substantially cylindrical structure, and an inner chamber is formed inside the housing 200. The housing 200 further includes two connecting pipes 201 and 202 located at two ends of the cylindrical structure, respectively. The connecting pipes 201 and 202 each have an inner end communicated to the inner chamber and an outer end connected to a corresponding pipeline. Two control valve components 400 are respectively arranged at locations close to two ends of the inner chamber and divide the inner chamber into a filter chamber 211 located at the middle and transitional chambers 212 and 213 respectively located at the two ends, and a filter core 300 is arranged in the filter chamber 211.

As shown in FIG. 2, the control valve component 400 includes a frame body 440, an outlet blocking piece 430 and an inlet blocking piece 450. The frame body 440 is of a disc shape, and a periphery thereof is hermetically connected to an inner wall of the housing 200, and the frame body 440 is provided with an outlet 441 and an inlet 442. The outlet blocking piece 430 is located at an outer side of the frame body 440 and is capable of cooperating with the outlet 441 under the action of an elastic member 420. The inlet blocking piece 450 is located at an inner side of the frame body 440 and is capable of cooperating with the inlet 442 under the action of an elastic member 460. As shown in the Figures, the outlet 441 is located at the middle of the frame body 440, and the inlet 442 is located around the outlet 441. The outlet blocking piece 430 is fixed by a rivet 410 and is slidable in an extending direction of the rivet 410. Two ends of the elastic member 420 are respectively supported on the rivet 410 and an outer side surface of the outlet blocking piece 430. The elastic member 460 is a spring leaf, the inlet blocking piece 450 is mounted at one end of the spring leaf, and in a free state, the inlet blocking piece 450 hermetically cooperates with the inlet 442 under the action of the spring leaf.

Figure 21:
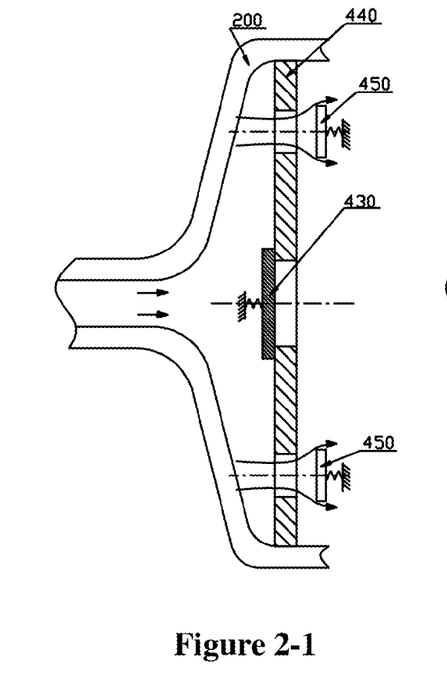
Figure 22:
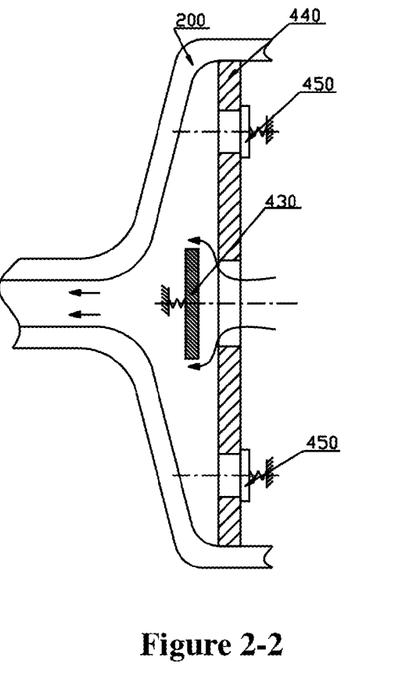

Referring to FIGS. 1, 2-1 and 2-2, the operating process of the bidirectional filter is described as follow. Under the action of the heat pump unit, the refrigerant flows in the pipelines at an appropriate pressure. The control valve component 400 at the left side (in reference with FIG. 1) is at the state shown in FIG. 2-1 when the refrigerant flows into the bidirectional filter from the connecting pipe 202 and flows out of the connecting pipe 201, and the inlet blocking piece 450 is moved inwards under the pressure of the refrigerant to be separated from the inlet 442, thus the inlet 442 is opened. At the same time, the outlet blocking piece 430 is remained in hermetical cooperation with the outlet 441 under the pressure of the refrigerant. At this time, the refrigerant flows from the transitional chamber 212 into the filter chamber 211 through the inlet 442, and then flows to the middle of the filter core 300 through the periphery of the filter core 300 and then flows to an inner side of the outlet 441 of the control valve component 400 at the right side. At this time, the control valve component 400 at the right side is at the state shown in FIG. 2-2, the outlet blocking piece 430 is moved outwards under the pressure of the refrigerant to be separated from the outlet 441, thus the outlet 441 is opened; and the inlet blocking piece 450 is remained in hermetical cooperation with the inlet 442 under the pressure of the refrigerant. At this time, the refrigerant flows out of the filter chamber 211 through the outlet 411 of the control valve component 400 at the right side, and flows out of the bidirectional filter through the transitional chamber 213 at the right side and the connecting pipe 201.

When the refrigerant flows into the bidirectional filter from the connecting pipe 201 and flows out through the connecting pipe 202, the states of the control valve component 400 at the left side and the control valve component 400 at the right side are switched, that is, the refrigerant flows through the inlet 442 of the control valve component 400 at the right side, the filter core 300, and the outlet 441 of the control valve component 400 at the left side in sequence. Through the above process, the bidirectional filter may purify the refrigerant when the refrigerant flows in different directions.

During the practical application, the operating process is complicated, thus the pressure of the refrigerant in the pipeline is generally variable. When the refrigerant has a relatively high pressure, the outlet blocking piece 430 is moved by a relatively great distance, which may reduce a flowing section between an outer side surface of the outlet blocking piece 430 and an inner end port of the connecting pipe 201 or the connecting pipe 202, cause a greater resistance to flow of the refrigerant, and cause a throttling phenomenon at an inner end of the connecting pipe 201 or the connecting pipe 202, and in a worse case, may cause a sharp decrease of the temperature at this part and cause frosting. When the outlet blocking piece 430 is moved by a great distance under the pressure of the refrigerant, the connecting pipe 201 or the connecting pipe 202 may be blocked, which may in turn cause a failure of the bidirectional filter. Therefore, a problem to be solved by those skilled in the art is to reduce the disadvantageous impacts on the bidirectional filter caused by the pressure variation of the refrigerant.

Furthermore, an abrupt change or instability of the pressure of the refrigerant may cause deformation of the outlet blocking piece 430, which may in turn affect the cooperation relationship between the outlet blocking piece 430 and the outlet 441, thus the outlet 441 can not be sealed. In this way, a part of the refrigerant may directly flow into the filter chamber through the outlet 441 of the control valve component 400 at one side, and flow out through the outlet of the control valve component 400 at the other side, which causes a partial failure of the bidirectional filter.

SUMMARY

Therefore, an object of the present application is to provide a bidirectional filter, which may reduce disadvantageous effects on the bidirectional filter caused by a pressure variation of the refrigerant.

Based on the bidirectional filter, another object of the present application is to provide a heat pump system including the bidirectional filter.

In order to achieve the above objects, the present application provides a bidirectional filter including a housing and at least two control valve components, two of the control valve components dividing an inner chamber of the housing into a filter chamber and two transitional chambers, each of the control valve components including a frame body fixed to an inner wall of the housing, and an outlet blocking piece cooperating with an outlet of the frame body, the outlet blocking piece being located at an outer side of the frame body, wherein, the bidirectional filter further includes a protective member located in each of the transitional chambers and fixed with respect to the housing, and the protective member has a protective surface opposite to an outer side surface of the outlet blocking piece.

Optionally, the protective member includes a protective rod and a protective piece, the protective rod has a root end connected to the inner wall of the housing and a terminal end protruding towards the outlet blocking piece, the protective piece is connected to the terminal end of the protective rod, and the protective surface is formed on the protective piece.

Optionally, the protective member includes a protective rod and a protective piece, the protective rod has a root end connected to the frame body and a terminal end protruding outwards, the protective piece is connected to the terminal end of the terminal rod, and the protective surface is formed on the protective piece.

Optionally, the protective member includes a plurality of protective rods, the protective piece is an annular plate, and the terminal end of each of the protective rods is connected to the annular plate.

Optionally, the plurality of protective rods are uniformly distributed around a central line of the outlet.

Optionally, the annular plate forms an annular protective surface opposite to a periphery of the outer side surface of the outlet blocking piece.

Optionally, in a free state, a distance between the protective surface and the outer side surface of the outlet blocking piece is ranged from 3 mm to 20 mm.

Optionally, the housing includes a main body and a protective mounting plate, the protective mounting plate is mounted at an inner side of the main body via adjustment threads, and the protective member is connected to the protective mounting plate.

The present application further provides a hot pump system including an outdoor heat-exchanging system, a heat pump unit and an indoor air conditioner terminal system which are connected to each other by pipelines, and further including a bidirectional filter connected in the pipelines, wherein the bidirectional filter is any one of the bidirectional filters described above.

The bidirectional filter according to the present application is provided with a protective member fixed with respect to the housing, and the protective member has a protective surface opposite to the outdoor blocking piece. Hence, when the pressure of the refrigerant in the pipeline is too high, the protective surface of the protective member restricts the displacement of the outlet blocking piece so as to maintain the distance between the inner end port of the connecting pipe and the outlet blocking piece in a predetermined range, and avoid a too small flowing section between the filter chamber and the connecting pipe, thus the refrigerant may pass through smoothly, and the disadvantageous effects on the bidirectional filter caused by the pressure variation of the refrigerant may be reduced. Meanwhile, since the displacement of the outlet blocking piece is restricted by the protective member, the deformation of the outlet blocking piece caused by pressure can also be restricted, thereby maintaining a good cooperation between the outlet blocking piece and the outlet, and improving the reliability of the control valve component.

In a further technical solution, the protective member includes a plurality of protective rods and a protective piece. The protective piece is an annular plate, and the terminal end of each protective rod is connected to the annular plate. The protective piece, being the annular plate, can reduce the deformation of the outlet blocking piece caused by the pressure of the refrigerant, and at the same time better restrict the displacement of the outlet blocking piece. In addition, the protective piece is supported by the plurality of protective rods, thus, on one hand, the stability and reliability of the protective piece are ensured, and on the other hand, a suitable flow passage is provided for the refrigerant which reduces or avoids disadvantageous effect on the flowing of the refrigerant caused by the protective member.

In a further technical solution, the protective member is mounted on the main body of the housing via adjustment threads. In this way, according to actual requirements, the distance between the protective surface and the outer side surface of the outlet blocking piece can be adjusted by rotating the protective member, so as to adjust the restricted range of the outlet blocking piece and adjust the overall performance of the bidirectional filter.

The heat pump system including the above bidirectional filter according to the present application also has the corresponding technical effects.

BRIEF DESCRIPTION OF THE DRAWINGS

FIG. 2-1 is a schematic view showing an operating principle of the control valve component of FIG. 2 with an outlet being closed and an inlet being opened;

FIG. 2-2 is a schematic view showing an operating principle of the control valve component of FIG. 2 with the outlet being opened and the inlet being closed;

FIG. 6-1 is a schematic view showing an operating principle of a control valve component with an outlet being closed and an inlet being opened;

FIG. 6-2 is a schematic view showing an operating principle of the control valve component with the outlet being opened and the inlet being closed.

DETAILED DESCRIPTION

The present application will be described in detail in conjunction with drawings, and the following description is exemplary and explanatory, and should not be interpreted as limitation to the content of the present application.

It should to be noted that, terms indicating the directions and positions, such as inner or outer, are defined on the basis of a filter core of a bidirectional filter, "outer" refers to a position away from the filter core, and "inner" refers to a position close to the filter core.

Figure 3:
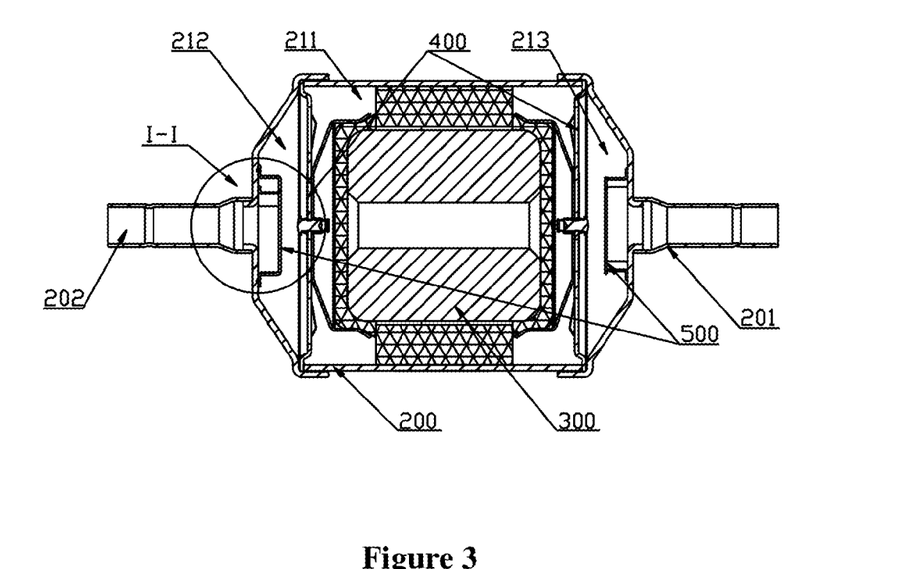
FIG. 3 is a schematic view showing a structural principle of a bidirectional filter according to a first embodiment of the present application.
Figure 4:
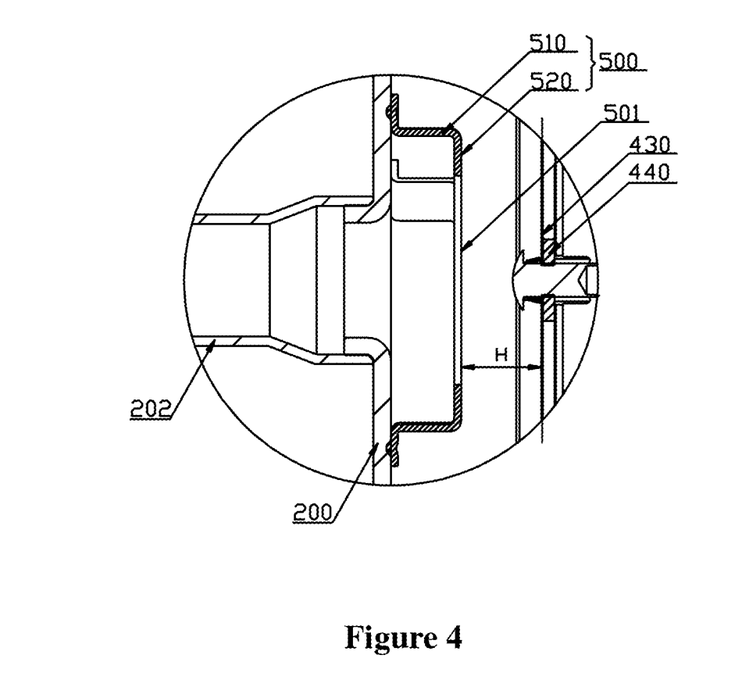
FIG. 4 is an enlarged view of portion I-I in FIG. 3.
Figure 5:
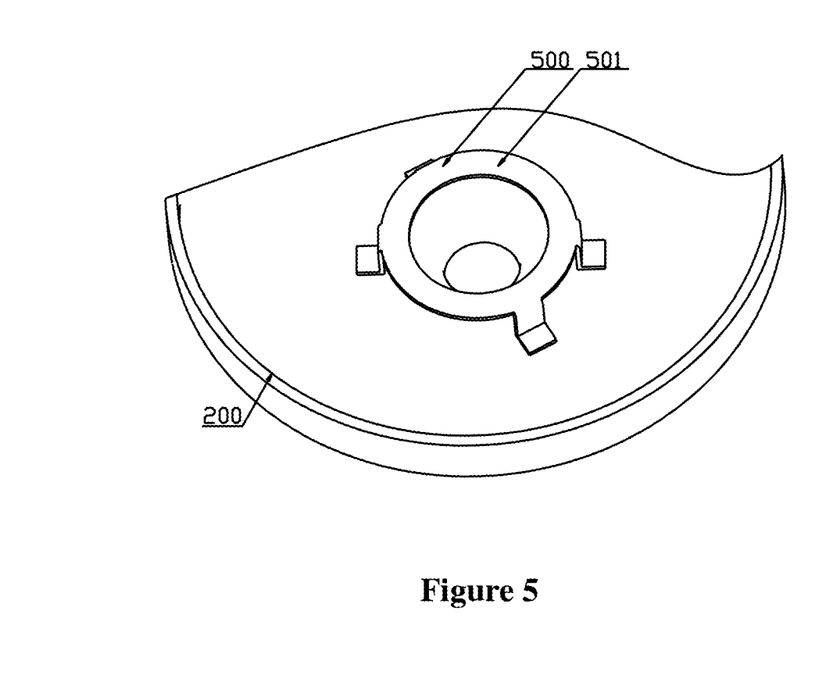
FIG. 5 is a perspective schematic view showing an assembling structure of a protective member and a housing.

Reference is made to FIGS. 3, 4 and 5, FIG. 3 is schematic view showing a structural principle of a bidirectional filter according to a first embodiment of the present application; FIG. 4 is an enlarged view of portion I-I in FIG. 3; and FIG. 5 is a perspective schematic view showing an assembling structure of a protective member and a housing.

Similar to the description in the background of the present application, a bidirectional filter according to an embodiment of the present application includes a housing 200 and two control valve components 400. The two control valve components 400 divide an inner chamber of the housing 200 into a filter chamber 211 located at the middle and transitional chambers 212 and 213 respectively located at two ends. The filter chamber 211 is provided with a filter core 300. The housing 200 further includes two connecting pipes 201 and 202. Structure and operating principle of the control valve component 400 in the present application may be the same as those of the control valve component 400 described in the background of the present application, thus will not be described herein.

As shown in FIG. 3, in the bidirectional filter according to the first embodiment, two protective members 500 are further arranged in the inner chamber of the housing 200. The two protective members 500 are respectively located in the two transitional chambers 212 and 213, and are respectively corresponding to the two control valve components 400. Since the bidirectional filter according to this embodiment has a bilateral symmetric structure, the technical solution according to the present application will be described hereinafter by taking only the protective member 500 at the left side as an example.

Referring to FIGS. 4 and 5, the protective member 500 in this embodiment includes a protective rod 510 and a protective piece 520. The protective rod 510 has a root end (the end at the left side in FIG. 4) fixedly connected to an inner wall of the housing 200 by welding, and a terminal end protruding by a certain distance toward an outlet blocking piece 430 of the control valve component 400. The protective rod 510 has a predetermined length. In this example, the protective member 500 includes four protective rods 510 which are extending substantially parallel to each other and uniformly distributed around a central line of the outlet 441. In this example, the central line of the outlet 441 substantially coincides with a central line of the connecting pipe 202, and the four protective rods 510 are also uniformly distributed around an inner end port of the connecting pipe 202. The protective piece 520 is an annular plate, which has a central line substantially coinciding with the central line of the outlet 441 and extends in a direction substantially perpendicular to the central line of the outlet 441. The terminal end of the protective rod 510 is fixed to an outer surface of the annular plate, and the inner surface of the annular plate forms a protective surface 501. The protective surface 501 is opposite to an outer side surface of the outlet blocking plate 430 and is spaced from the outer side surface of the outlet blocking plate 430 by a predetermined distance H. The distance H may be determined according to an actual requirement and the performance of the refrigerant, and may be selected in a range between 3 mm and 20 mm. In this example, the distance H is 6.6 mm. In this example, the protective member 500 is an integral member, and the protective rod 510 and the protective piece 520 are integrally formed. Apparently, the protective rod 510 and the protective piece 520 may be separately formed and fixed together in any suitable manner.

Figure 61:
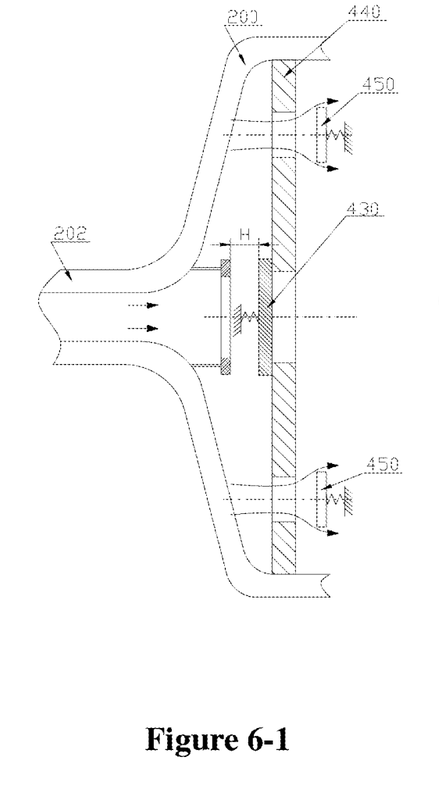
Figure 62:
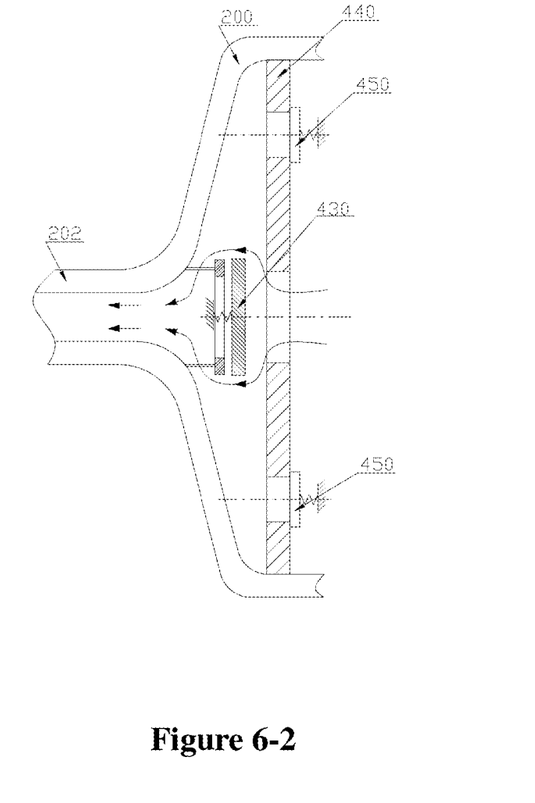

Reference is made to FIGS. 6-1 and 6-2, FIG. 6-1 is a schematic view showing an operating principle of the control valve component with an outlet being closed and an inlet being opened; and FIG. 6-2 is a schematic view showing an operating principle of the control valve component with the outlet being opened and the inlet being closed.

Reference is made to FIGS. 3 and 6-1, when the refrigerant flows in a direction indicated by an arrow in FIG. 6-1, the outlet 441 of the control valve component 400 is closed and the inlet 442 thereof is opened under the pressure of the refrigerant, thus the control valve component 400 cuts off a passageway from the filter chamber 211 to the transitional chamber 212 and opens a passageway from the transitional chamber 212 to the filter chamber 211. At this time, the refrigerant flows from the transitional chamber 212 into the filter chamber 211 via the inlet 442. Due to the protective member, the refrigerant may flow in a space among the protective rods 510 and a space between the protective surface 501 and the outlet blocking piece 430.

Referring to FIGS. 3 and 6-2, when the refrigerant flows in a direction indicated by an arrow in FIG. 6-2, the outlet 441 of the control valve component 400 is opened and the inlet 442 thereof is closed under the pressure of the refrigerant, thus the control valve component 400 opens the passageway from the filter chamber 211 to the transitional chamber 212 and cuts off the passageway from the transitional chamber 212 to the filter chamber 211. At this time, the refrigerant flows from the filter chamber 211 to the transitional chamber 212 via the outlet 441. A moving distance of the outlet blocking piece 430 of the control valve component 400 increases as the pressure of the refrigerant increases. When the pressure of the refrigerant is low or in a predetermined normal range, the moving distance of the outlet blocking piece 430 is smaller than H, and the operation process of the control valve component 400 is same as that described in the background of the present application, and the refrigerant flows to the connecting pipe 202 through the space among the protective rods 510. When the pressure of the refrigerant is relatively high or abruptly increased, the moving distance of the outlet blocking piece 430 is increased, and when the moving distance of the outlet blocking piece 430 is greater than H, the outer side surface of the outlet blocking piece 430 abuts against the protective surface 501 of the protective member 500, and the protective member 500 restricts the displacement of the outlet blocking piece 430 so as to maintain the distance between the inner end port of the connecting pipe 202 and the outlet blocking piece 430 in a predetermined range, and avoid a too small flowing section between the filter chamber 212 and the connecting pipe 202, thus the refrigerant may pass through smoothly, and the disadvantageous effects on the bidirectional filter caused by the pressure variation of the refrigerant may be reduced. Meanwhile, since the displacement of the outlet blocking piece 430 is restricted by the protective member 500, the deformation of the outlet blocking piece 430 can also be restricted, which avoids plastic deformation of the outlet blocking piece 430, thereby maintaining a good cooperation between the outlet blocking piece 430 and the outlet 441, and improving the reliability of the control valve component.

In the first embodiment, the protective piece 520 mainly functions to restrict the displacement of the outlet blocking piece 430 via the protective surface 501; and the protective piece 520 is an annular plate, which may ensure the rigid of the whole protective piece 520, and improve the reliability of the protective piece 520. The protective surface 501 is an annular protective surface opposite to a periphery of the outer side of the outlet blocking piece 430, thus may evenly restrict the outlet blocking piece 430, and avoid a large deformation of the outlet blocking piece 430 caused by uneven stress when the pressure of the refrigerant is too high, and ensure the cooperation between the outlet blocking piece 430 and the outlet 441. It can be understood that, the protective piece 520 is not limited to the annular plate and may be in other structures. Similarly, the protective surface 501 is not limited to the annular protective surface and may be in other structures. For example, the protective surface may be divided into multiple sections for restricting the outlet blocking piece 430 at multiple positions, respectively.

According to the above description, it can be understood that, the performance of the control valve component 400 may be adjusted by appropriately setting the distance H between the protective surface 501 and the outer side surface of the outlet blocking piece 430 and the length of the protective rod 510, thereby reducing the flow resistance of the refrigerant caused by the protective member 500, and at the same time reducing the disadvantageous effects on the bidirectional filter caused by the pressure variation of the refrigerant. In this example, the protective member 500 is provided with a plurality of protective rods 510 located around the central line of the outlet 441, thereby ensuring the stability of the protective piece 520, and reducing the disadvantageous effects on the flowing of the refrigerant caused by the deformation of the protective piece 520.

Figure 7:
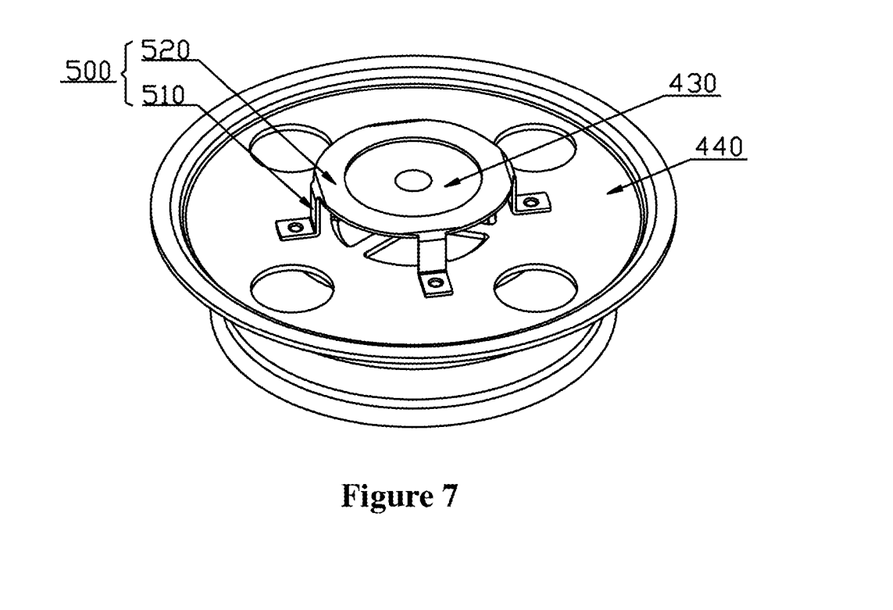
FIG. 7 is a schematic view showing a connection structure between a protective member and a control valve component in a bidirectional filter according to a second embodiment of the present application.

In the first embodiment, the protective rod 510 functions to fix the protective piece 520. In the practical application, the fixing manners of the protective piece 520 may be determined based on the actual requirements and are not limited to those structures described above. Reference is made to FIG. 7, which is a schematic view showing a connection structure between a protective member 500 and a control valve component 400 in a bidirectional filter according to a second embodiment of the present application. In this embodiment, a protective rod 510 of the protective member 500 has a root end connected to an outer side surface of a frame body 440 of the control valve component 400, and a terminal end protruding outwards. The protective piece 520 has the same structure as the protective piece in the first embodiment, and is connected to the terminal end of the protective rod 520. The frame body 440 is fixed to the housing 200, thus the protective member 500 is fixed with respect to the housing 200. An inner side surface of the protective member 520 forms a protective surface 501 to restrict a displacement of the outlet blocking piece 430. For ensuring the stability and reliability of the protective piece 520, a plurality of protective rods 510 are also arranged around the outlet 441. According to the above description, it can be understood that, the arranging manners of the protective rod 510, as a component for connecting the protective piece 520, are not limited to the above manner.

Based on the above description of the structure of the protective member 500, it can be understood that, the structure of the protective member 500 may be changed accordingly based on actual situations. The object of the present application can be achieved as long as the protective member 500 is fixed with respect to the housing 200 and is provided with the protective surface 501 corresponding to the outer side surface of the outlet blocking piece 430 to restrict the outlet blocking piece 430, under the condition that the flowing of the refrigerant is ensured.

According to the above description, the distance H between the protective surface 501 of the protective member 500 and the outer side surface of the outlet blocking plate 430 can be determined based on the actual requirements and the performance of the refrigerant. In order to improve the adaptability and application range of the bidirectional filter, and adjust the overall performance of the bidirectional direction, the housing 200 includes a main body and a protective mounting plate located at an inner side of the main body, and the protective mounting plate is mounted at the inner side of the main body via adjustment threads, and the protective member 500 is fixedly connected to the protective mounting plate. When it is required to adjust the distance H, the relative position between the protective member 500 and the housing 200 may be changed by rotating the protective mounting plate, so as to adjust the flow resistance of the refrigerant caused by the protective member 500, thereby adjusting the overall performance of the bidirectional filter.

It should be noted that, although the technical solutions of the present application are described hereinabove based on the bidirectional filter in the background of the present application, the technical solutions of the present application are not limited to the above structures. For example, the outlet 441 of the control valve component 400 of the bidirectional filter is not limited to be located at the middle of the frame body 440, the plurality of inlets 442 are not limited to be located around the outlet 441, and the outlet 441 and the inlet 442 can be arranged in the opposite manner.

Based on the bidirectional filter described hereinabove, a heat pump system according to the present application includes an outdoor heat-exchanging system, a heat pump unit and an indoor air conditioner terminal system which are connected to each other via pipelines. The heat pump system further includes a bidirectional filter connected in the pipelines. The bidirectional filter can be any one of the bidirectional filters described hereinabove. Since the bidirectional filter has the above technical effects, the heat pump system including the bidirectional filter also has the corresponding technical effects.

The technical solutions of the present application are illustrated herein by specific examples. The above description of examples is only intended to help the understanding of the technical solutions of the present application. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. A bidirectional filter, comprising a housing and at least two control valve components, two of the control valve components dividing an inner chamber of the housing into a filter chamber and two transitional chambers, each of the control valve components comprising a frame body fixed to an inner wall of the housing and an outlet blocking piece cooperating with an outlet of the frame body, the outlet blocking piece being located at an outer side of the frame body, wherein, the bidirectional filter further comprises a protective member located in each of the transitional chambers and fixed with respect to the housing, and the protective member has a protective surface opposite to an outer side surface of the outlet blocking piece; and wherein the protective member comprises a protective rod and a protective piece, the protective rod has a root end connected to the inner wall of the housing and a terminal end protruding towards the outlet blocking piece, the protective piece is connected to the terminal end of the protective rod, and the protective surface is formed on the protective piece.

2. The bidirectional filter according to claim 1, wherein the protective member comprises a plurality of protective rods, the protective piece is an annular plate, and the terminal end of each of the protective rods is connected to the annular plate.

3. The bidirectional filter according to claim 2, wherein the plurality of protective rods are uniformly distributed around a central line of the outlet.

4. The bidirectional filter according to claim 2, wherein the annular plate forms an annular protective surface opposite to a periphery of the outer side surface of the outlet blocking piece.

5. The bidirectional filter according to claim 1, wherein in a free state, a distance between the protective surface and the outer side surface of the outlet blocking piece is ranged from 3 mm to 20 mm.

6. The bidirectional filter according to claim 5, wherein the housing comprises a main body and a protective mounting plate, the protective mounting plate is mounted at an inner side of the main body via adjustment threads, and the protective member is connected to the protective mounting plate.

7. The bidirectional filter according to claim 1, wherein the housing comprises a main body and a protective mounting plate, the protective mounting plate is mounted at an inner side of the main body via adjustment threads, and the protective member is connected to the protective mounting plate.

8. A hot pump system, comprising an outdoor heat-exchanging system, a heat pump unit and an indoor air conditioner terminal system which are connected to each other by pipelines, and further comprising a bidirectional filter connected in the pipelines, wherein the bidirectional filter is the bidirectional filter according to claim 1.

9. A bidirectional filter, comprising a housing and at least two control valve components, two of the control valve components dividing an inner chamber of the housing into a filter chamber and two transitional chambers, each of the control valve components comprising a frame body fixed to an inner wall of the housing and an outlet blocking piece cooperating with an outlet of the frame body, the outlet blocking piece being located at an outer side of the frame body, wherein, the bidirectional filter further comprises a protective member located in each of the transitional chambers and fixed with respect to the housing, and the protective member has a protective surface opposite to an outer side surface of the outlet blocking piece;

the protective member comprises a protective rod and a protective piece, the protective rod has a root end connected to the frame body and a terminal end protruding outwards, the protective piece is connected to the terminal end of the terminal rod, and the protective surface is formed on the protective piece; and wherein the protective member comprises a plurality of protective rods, the protective piece is an annular plate, and the terminal end of each of the protective rods is connected to the annular plate.

10. The bidirectional filter according to claim 9, wherein the plurality of protective rods are uniformly distributed around a central line of the outlet.

11. The bidirectional filter according to claim 9, wherein the annular plate forms an annular protective surface opposite to a periphery of the outer side surface of the outlet blocking piece.

12. The bidirectional filter according to claim 9, wherein in a free state, a distance between the protective surface and the outer side surface of the outlet blocking piece is ranged from 3 mm to 20 mm.

13. A hot pump system, comprising an outdoor heat-exchanging system, a heat pump unit and an indoor air conditioner terminal system which are connected to each other by pipelines, and further comprising a bidirectional filter connected in the pipelines, wherein the bidirectional filter is the bidirectional filter according to claim 9.

* * * * *